(12) United States Patent
Chen

(10) Patent No.: US 9,884,981 B2
(45) Date of Patent: Feb. 6, 2018

(54) POLYOL COMPOSITIONS FOR HOT MELT ADHESIVES

(71) Applicant: IFS Industries Inc., Reading, PA (US)

(72) Inventor: Zhijin Chen, Reading, PA (US)

(73) Assignee: IFS Industries Inc., Reading, PA (US)

( * ) Notice: Subject to any disclaimer, the term of this patent is extended or adjusted under 35 U.S.C. 154(b) by 151 days.

(21) Appl. No.: 14/627,745

(22) Filed: Feb. 20, 2015

(65) Prior Publication Data

US 2015/0259582 A1    Sep. 17, 2015

Related U.S. Application Data

(60) Provisional application No. 61/942,786, filed on Feb. 21, 2014.

(51) Int. Cl.
*C09J 175/08* (2006.01)
*C08G 63/672* (2006.01)
*C08G 63/91* (2006.01)

(52) U.S. Cl.
CPC .......... *C09J 175/08* (2013.01); *C08G 63/914* (2013.01)

(58) Field of Classification Search
CPC ..... C09J 175/08; C09J 175/06; C08G 63/914; C08G 63/916; C08G 63/918
See application file for complete search history.

(56) References Cited

U.S. PATENT DOCUMENTS

| | | |
|---|---|---|
| 3,075,999 A | 1/1963 | June et al. |
| 3,178,454 A | 4/1965 | Kloos et al. |
| 4,115,350 A * | 9/1978 | Lazarus ............ C08G 63/42 264/211 |
| 4,525,575 A | 6/1985 | Yeater |
| 6,121,389 A * | 9/2000 | Kooijmans ........... C08G 59/12 525/437 |
| 6,433,217 B1 | 8/2002 | Rosenbrand et al. |
| 6,881,786 B2 | 4/2005 | Swarup et al. |
| 2004/0171748 A1 * | 9/2004 | Ramesh ............ B01F 17/005 524/602 |
| 2010/0256322 A1 | 10/2010 | Kramer et al. |

FOREIGN PATENT DOCUMENTS

WO    WO 2013056813 A1 *    4/2013    ............. C08G 63/46

OTHER PUBLICATIONS

Chen et al., "Synthesis and application of polyethers with medium-high molecular weight," Petroleum and Coal, 43 (1):45-50, 2001.
Evonik Industries. Dynacoll 7250. Copyright: Sep. 27, 2006 [retrieved Sep. 3, 2015]. Retrieved from the Internet: <URL: http://coatings.panpage.de/En/Resins/DYNACOLL/DYNACOLL_7250_e.pdf>, 2 pages.
International Search Report and Written Opinion for PCT/US2015/016915, dated May 22, 2015, 9 pages.
International Preliminary Report on Patentability for PCT/US2015/016915, dated Sep. 1, 2016, 7 pages.

* cited by examiner

*Primary Examiner* — Christopher M Rodd
(74) *Attorney, Agent, or Firm* — Fish & Richardson P.C.

(57) ABSTRACT

Disclosed are polyether and polyesters polyol condensations. The polyols are uniquely suited for ease of manufacture and improved adhesive characteristics particularly for low surface energy materials. The materials can be used in urethane adhesives.

10 Claims, 2 Drawing Sheets

POLYOL COMPOSITIONS FOR HOT MELT ADHESIVES

CROSS-REFERENCE TO RELATED APPLICATION

This application claims the benefit of U.S. Provisional Patent Application Ser. No. 61/942,786, filed Feb. 21, 2014, which application is hereby incorporated by reference in its entirety.

FIELD OF THE INVENTION

The compositions relate to polyol materials. The polyols are polymeric acid or hydroxyl terminated materials that are end capped. The polymer polyols can be used with a reactive curing agent such as an isocyanate compounds or used in formulated curable adhesives.

BACKGROUND OF THE INVENTION

In the preparation of polyether and polyester polyol materials, and particularly in the manufacture of polyester materials, control of acid number, hydroxyl number, reaction conditions and molecular weight can be important in order to increase polyol productivity. Improved polyol materials can also produce improved adhesive properties in the formulated curable adhesive materials, including urethane adhesives.

While a number of polyether and polyester polyols have been formulated, a substantial need still exists in obtaining improved polyether and polyester polyol preparation or processing that can improve manufacturing efficiency, control of acid number or hydroxyl number and molecular weight. A further need exists to obtain improved adhesive properties in a final adhesive formulation.

BRIEF DISCLOSURE

We have found that the use of a glycidyl ether or ester compound as a capping agent can improve the manufacture of and the properties of polymer polyol compounds. Capped polyol compositions of the disclosure are substantially linear polyether or polyester polyols with an acid number equal to or less than about 2 or a hydroxyl number equal to or greater than 10 shows improved properties when used in curable (i.e.) polyurethane adhesive materials. The capped polyols when used with suitable isocyanate reactive compounds produce improved adhesive strength in bonding particularly low surface energy materials such as polyolefins and ABS resins.

The processes for manufacturing the polyol compositions and specifically polyester polyol materials are improved in terms of efficiency and yield.

Polyether polyols are typically made by polymerizing alkylene oxide materials to form substantially linear polymers.

Polyester polyols can be made by polymerizing multi-functional aliphatic or aromatic carboxylic acids (two or more carboxylic groups) with a multifunctional aliphatic or aromatic alcohol (two or more hydroxyl groups) compounds resulting in polyester materials having residual acidic or hydroxyl functionality, measured by acid number or hydroxyl number. Lower alcohol esters of the carboxylic acids can be used in the poly-esterification.

We have found that useful precursor polyester polyol materials having an acid number or hydroxyl number of about 5 to 30 can be reacted with a glycidyl compound. The amount of glycidyl compound is used that reacts with residual active hydrogen (acid or hydroxyl) to cap the polymer and complete the reaction but leaving sufficient hydroxyl to be useful in a reaction with isocyanate. The use of the glycidyl compound can also provide the manufacture of the polyol material with molecular weight control and improved adhesive properties. In the polyester, the mole ratio of hydroxyl:carboxyl (—OH:—CO$_2$H) can be 1.2:1 to 0.8:1 or 1.1:1 to 0.9:1. The molecular weight ($M_n$) of the capped material is greater than 500 and is often 1000 to 16000 or 2000 to 4000.

We have further found in manufacture of polyester polyols particularly from dicarboxylic acids and di-hydroxyl compounds that the glycidyl ester compound can be used to substantially reduce manufacturing time, control molecular weight and improve the properties of the resulting adhesive materials. The use of the glycidyl capping agent results in reduced reaction time and increased productivity. The glycidyl compound permits the reaction to end before all consuming the maximum amount of the reactants. As the concentration of the reactants is reduced by the esterification, the reaction rate slows. At this point, if the molecular weight is sufficient, the glycidyl agent can be used to react with remaining active hydrogen compound to compete the synthesis. Molecular weights are measured as number average ($M_n$). In this way the reaction does not need to be driven to completion. Amounts of materials are selected such that the hydroxyl or acid number of the finished materials is sufficient to react with (e.g.) an isocyanate compound in a formulated adhesive.

BRIEF DESCRIPTION OF DRAWINGS

Certain viscosity and reaction characteristics of the claimed adhesives are shown in FIGS. 1 and 2, respectively.

DETAILED DISCUSSION

Figure 1:
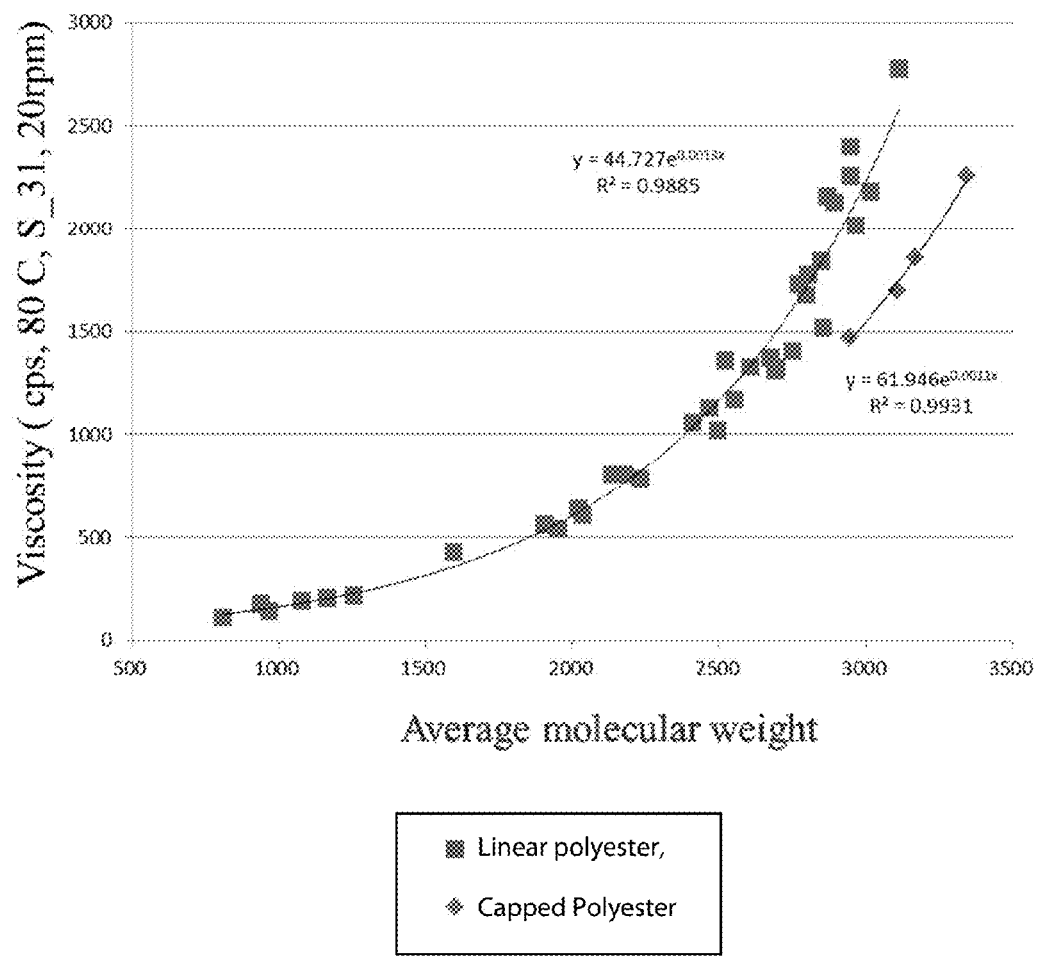
FIG. 1 is a graph showing a relationship between viscosity and average molecular weight for a precursor (linear) polyester and a capped polyester.

In a first aspect of the invention is a generic polymeric polyol precursor compound having an acid number or a hydroxyl number of about 5 to 30 that can be reacted with a glycidyl compound resulting in end cap of the polyol.

In another aspect of the invention, a polyether polyol can be manufactured by reacting a poly alkylene oxide polyol with the glycidyl compound.

In a further aspect of the invention, a polyester polyol can be reacted with the glycidyl compound of the invention. Substantially linear polyester polyols of dicarboxylic acids and di hydroxyl compound can be made with useful molecular weight and reactivity.

In a still further aspect of the invention, the capping agent can be used in a method for the manufacturer of a polyester polyol using substantially linear polyester polyols of dicarboxylic acids and di hydroxyl compound such as an aliphatic dicarboxylic acid, and aliphatic dihydroxy compound in order to form a preliminary polyester reaction product. When that reaction product achieves molecular weight of at least 500 or at least 2000, an acid number of 5 to 100 or, the precursor reaction product can be reacted with the glycidyl compound such as a glycidyl ester compound to complete the reaction and form the finished capped polymeric polyol material. In this way the reaction does not have to be forced to completion as the concentration of the acid and hydroxyl reactants are reduced. The amount of glycidyl compound is selected to react with acid and hydroxyl functionality leaving a finished material with an acid number (less than or equal to 2 or less than 1) or hydroxyl number (less than 6 or less than 12 or less than 112) and a residual glycidyl content of less than 0.1%, 0.05 or 0.02% for further use such as in a urethane adhesive. Since the use of the glycidyl ester compound then reacts with available acid and hydroxyl material in the reaction product, then the polyol synthesis is rapidly brought to completion much sooner than if left to simply finish by the esterification polymerization.

The invention is also directed to capped polymeric polyester polyol comprising the reaction product of a polyester polyol having a molecular weight greater than about 500. The hydroxyl number can be consistent with the levels disclosed herein. The glycidyl compound can have a formula:

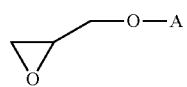
I wherein A is an ester or ether residue or moiety and O is oxygen and wherein A can be linear or branched, saturated or unsaturated, acyl, aliphatic or aromatic hydrocarbon radical having from 2 to 30 carbon atoms, wherein the polyol is reacted with the glycidyl compound at a ratio of epoxy groups to hydroxyl groups as disclosed herein.

Glycidyl Compounds

Glycidyl compound are shown in the structural formula I as:

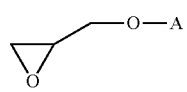
I wherein A is an ester or ether residue or moiety and O is oxygen. A can be linear or branched, saturated or unsaturated, acyl, aliphatic or aromatic hydrocarbon radical having from 2 to 30 carbon atoms. Alternately, glycidyl compounds, which contain glycidyl groups bonded directly to nitrogen or sulfur (where O═S or N) atoms can be employed in the process. Alkyl glycidyl ethers or esters or mixtures of alkyl glycidyl ethers or esters containing the requisite $C_{2-30}$ or $C_{4-22}$ alkyl substituents may be utilized for the preparation of the capped materials.

Glycidyl Ethers

Examples of alkyl glycidyl ethers include ethyl, butyl glycidyl ether, iso-butyl glycidyl ether, pentyl glycidyl ether, amyl glycidyl ether, hexyl glycidyl ether, ethyl hexyl glycidyl ether, iso-octyl glycidyl ether, n-decyl glycidyl ether, lauryl glycidyl ether, myristyl glycidyl ether, cetyl glycidyl ether, phenyl glycidyl ether benzyl etc.

Glycidyl Esters

Glycidyl esters are of the general structure set forth in structural formula I are the reaction product of one or a mixture of saturated monocarboxylic acids, preferably the alkali or tertiary ammonium salts thereof, and a halo-substituted monoepoxide.

Suitable saturated monocarboxylic acids which may be used to prepare the glycidyl esters are primary secondary and tertiary alkyl acids wherein containing 2-20 carbon atoms, more preferably 2-12 carbon atoms. Suitable such acids include neodecanoic, neotridecanoic, and pivalic acids. A particularly preferred acid is a neodecanoic acid prepared by the reaction of mono olefins averaging 8-40 carbon atoms in the molecule with carbon monoxide and water.

Suitable halo-substituted mono-epoxides which may be used to prepare the glycidyl esters include epichlorohydrin, 1-chloro-2,3-epoxyhexane, 1-chloro-2,3-epoxy-4-butyloctane, 1-chloro-2,3-epoxy heptane, 3-chloro-4,5-epoxydodecane, 3-chloro-4,5 epoxynonane, 1-chloro-2,3-epoxy-4-cyclohexyloctane and like materials.

Glycidyl esters of this type and their method of synthesis are well known in the art and are particularly described in the aforementioned U.S. Pat. No. 3,178,454 and U.S. Pat. No. 3,075,999.

Useful glycidyl esters are shown in U.S. Pat. No. 6,433,217 and are represented by the following formula II:

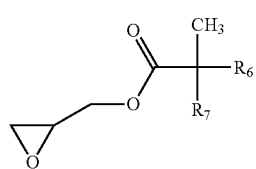
II

In the formula, R6 and R7 are typically linear or branched hydrocarbyl or alkyl groups having from about one to about 20 carbon atoms. Wherein the total carbon content of the branched alkali group of the acid group of the glycidyl ester as from about 5 to 25 carbon atoms and for certain embodiments from about 9 to about 15 carbon atoms. The glycidyl ester compositions useful in the compositions and processes disclosed herein are exemplified in the publication of Momentum entitled Cardura E10P.

Polyol for Capping Reaction

Polyols can be polyether polyols, which are made by the reaction of alkylene oxides or epoxides with active hydrogen containing starter compounds, or polyester polyols, which are made by the polycondensation of multifunctional carboxylic acids and multifunctional hydroxyl compounds.

Polyester Polyols

One useful class of polyester polyols are manufactured by the direct poly-esterification of high-purity diacids (or lower alcohol esters) and glycols, such as adipic acid and 1,4-butanediol at elevated temperature until the desired molecular weight (about 500 to 8000) is achieved. Polyester polyols are usually more expensive and more viscous than polyether polyols, but they make polyurethanes with better solvent, abrasion, and cut resistance. Other polyester polyols are based on trans-esterification (glycolysis) of poly(ethylene terephthalate) (PET) or dimethyl terephthalate (DMT) with glycols such as diethylene glycol.

Polyester polyol can be made from the following hydroxyl diols and triols reacted with dicarboxylic acid materials.

| Diols and triols used for polyester polyol synthesis | | | |
|---|---|---|---|
| No. | Polyol | MW, daltons | Hydroxyl number, mg KOH/g |
| Diols | | | |
| 1 | Ethylene glycol (EG) | 62.07 | 1807.6 |
| 2 | Diethylene glycol (DEG) | 106.12 | 1057.2 |
| 3 | 1,2 Propylene glycol (PG) | 76.10 | 1474.3 |
| 4 | 1,4 Butanediol (BD) | 90.12 | 1245.0 |
| 5 | Neopentyl glycol (NPG) | 104.0 | 1078.8 |
| 6 | 1,6 Hexanediol | 118.18 | 949.3 |
| 7 | 3-methyl-1,5-pentanediol (MPD) | 118 | 950.8 |

Diols and triols used for polyester polyol synthesis

| No. | Polyol | MW, daltons | Hydroxyl number, mg KOH/g |
|---|---|---|---|
| 8 | 1,9-Nonanediol (ND) | 160 | 710.3 |

Triols

| | | | |
|---|---|---|---|
| 1 | Glycerol | 92.10 | 1827.3 |
| 2 | Tri-methylol propane (TMP) | 122 | 1379.5 |

Aliphatic dicarboxylic acids used for polyester polyol synthesis

| No. | Dicarboxylic acid | MW, Daltons | Acid number, mg KOH/g |
|---|---|---|---|
| 1 | Adipic acid (AA) | 146.14 | 767.78 |
| 2 | Glutaric acid | 132.12 | 849.2 |
| 3 | Succinic acid | 118.09 | 950.1 |
| 4 | Sebacic acid | 202.0 | 555.4 |
| 5 | Azelaic acid | 186.0 | 603.2 |
| 6 | Dodecanedioic acid | 230.3 | 487.2 |

Aromatic dicarboxylic acids and derivatives used for polyester polyol synthesis

| No. | Dicarboxylic acid | MW, daltons | Acid number, mg KOH/g |
|---|---|---|---|
| 1 | Iso-phthalic acid (IPA) | 166.13 | 675.3 |
| 2 | Phthalic anhydride | 148.12 | 757.4 |
| 3 | Terephthalic acid | 166.13 | 675.3 |

Polyether Polyol

Polyols use dipropylene glycol (functionality 2), glycerin (functionality 3) or a sorbitol/water solution (functionality 2.75), sucrose (functionality 8), sorbitol (functionality 6), toluene diamine (equivalent of 4 hydroxyl). Propylene oxide and/or ethylene oxide is added to the initiators until the desired molecular weight (greater than about 500 or 8000) is achieved. The order of addition and the amounts of each oxide affect many polyol properties, such as compatibility, water-solubility, and reactivity. Polyols made with only propylene oxide are terminated with secondary hydroxyl groups and are less reactive than polyols capped with ethylene oxide, which contain a higher percentage of primary hydroxyl groups.

Polyether polyols can be represented by:

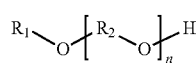

III

Wherein $R_1$ represents an initiator compound residue, $R_2$ is a $C_{2-4}$ alkylene group and n is a number of 2 to 100. The group $R_2$—O— also represents a polymer residue of polymerized ethylene oxide, propylene oxide or mixtures thereof. Due to their high hydroxyl number dendritic polyols are not useful in the claimed compositions.

Initiators used for the synthesis of polyols

| Starter | Functionality | Molecular weight (Daltons) | Hydroxyl number (mg KOH/g) |
|---|---|---|---|
| Water | 2 | 18 | 6233.3 |
| Ethylene glycol | 2 | 62 | 1807.9 |
| Diethylene glycol | 2 | 106 | 1057.4 |
| 1,2 Propylene glycol | 2 | 76.1 | 1474.6 |
| Dipropylene glycol (DPG) | 2 | 134.2 | 836.3 |
| Glycerin | 3 | 92 | 1829 |
| Tri-methylol propane | 3 | 134.2 | 1254.1 |
| 1,2,6 Hexanetriol | 3 | 134 | 1255 |
| Triethanolamine | 3 | 146 | 1152.7 |
| Ethylenediamine | 4 | 60 | 3740 |
| Pentaerythritol | 4 | 136.15 | 1648.18 |

Polymer Polyol Capping Reaction

The capping reaction combines a glycidyl compound with the polymer polyol and reacts the glycidyl compound with a group with an active hydrogen such as a carboxylic acid (—CO$_2$H) or hydroxyl (—OH) group. A resulting capped polyether structures can be represented as IVa or IVb:

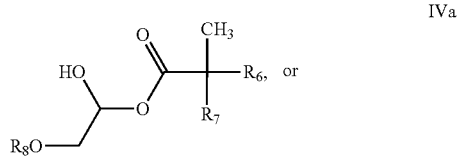

IVa

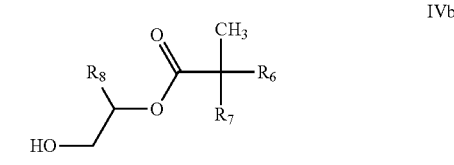

IVb

Capped polyester is represented by Va or Vb:

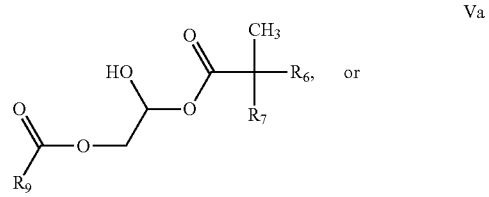

Va

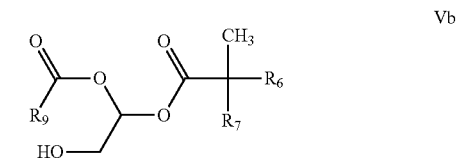

Vb wherein $R_8O$— represents the residue of —OH functionality of a polyether polyol or —OH functionality of a polyester polyol as structure VI:

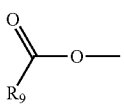

represents a residue of the acid functionality of a polyester polyol. The glycidyl reaction creates secondary hydroxyls or primary hydroxyls depending on the presence of catalyst that can react in a urethane adhesive. Amounts of materials are selected such that the hydroxyl or carboxylic acid functionality is fully reacted and made derivative by a matching amount of glycidyl compound. At the end of the reaction little or no free carboxylic acid, epoxy or glycidyl functionality should be detected.

Adhesive Technology

The remaining active hydrogen groups, primarily hydroxyl groups, in the capped polyols can be used to formulate curing adhesives. Any curing agent that can react with the active hydrogen or hydroxyl can be used in an adhesive. Useful adhesives are urethane and epoxy materials.

Polyurethanes are produced by reacting an isocyanate containing two or more isocyanate groups with a polyol containing on average two or more hydroxyl groups per molecule typically in the presence of a catalyst.

Isocyanates are very reactive materials. Aromatic isocyanates, diphenylmethane diisocyanate (MDI) or toluene diisocyanate (TDI) are more reactive than aliphatic isocyanates, such as hexamethylene diisocyanate (HDI) or isophorone diisocyanate (IPDI). Isocyanates are difunctional; two isocyanate groups per molecule. An important exception to this is polymeric diphenyl methane diisocyanate, which is a mixture of molecules with two-, three-, and four- or more isocyanate groups. In cases like this the material has an average functionality greater than two, commonly 2.7.

The capped polyols of the disclosure that are used to make polyurethane adhesives are not "pure" compounds since they are often mixtures of similar molecules with different molecular weights and mixtures of molecules that contain different numbers of hydroxyl groups, which is why the "average functionality" is often mentioned. The polymerization reaction makes a polymer containing the urethane linkage, —RNHCOOR'— and is catalyzed by tertiary amines, such as 1,4-diazabicyclo [2.2.2] octane (also called DABCO or TEDA), DMDEE (2,2'-dimorpholino diethyl ether) and metallic compounds, such as dibutyltin dilaurate or bismuth octanoate.

Aliphatic and cycloaliphatic isocyanates are used in smaller volumes, most often in coatings and other applications where color and transparency are important. The most important aliphatic and cycloaliphatic isocyanates are 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexyl methane, ($H_{12}$MDI or hydrogenated MDI).

Chain extenders are low molecular weight hydroxyl and amine terminated compounds that play an important role in the polymer morphology. The choice of chain extender also determines flexural, heat, and chemical resistance properties. The most important chain extenders are ethylene glycol, 1,4-butanediol (1,4-BDO or BDO), 1,6-hexanediol, cyclohexane dimethanol and hydroquinone bis(2-hydroxyethyl) ether (HQEE).

Polyurethane catalysts can be classified into two broad categories, amine compounds and metal complexes. Traditional amine catalysts have been tertiary amines such as triethylene diamine (TEDA, 1,4-diazabicyclo[2.2.2]octane or DABCO), dimethyl cyclohexylamine (DMCHA), and dimethyl ethanolamine (DMEA). Tertiary amine catalysts are selected based on whether they drive the urethane (polyol+isocyanate, or gel) reaction or the isocyanate trimerization reaction (e.g., using potassium acetate, to form isocyanurate ring structure). Catalysts that contain a hydroxyl group or secondary amine, which react into the polymer matrix, can replace traditional catalysts thereby reducing the amount of amine that can come out of the polymer.

Suitable additives for use in the present invention may be any compound which will not interfere with the efficacy of the other components in the adhesive composition and which increases adhesion. Suitable additives include, but are not limited to, reactive or non-reactive polymers, fillers, plasticizers, viscosity control agents, defoamers and stabilizers.

Exemplary Section

The following examples and data (reflected in the figures of the conversion of the materials into polyester) show the utility of the processes of the invention in obtaining high quality polyol materials for use in the compositions of the disclosure. The preparations are exemplary of the aspect of the invention using polyester polyol materials but should not be used in unduly limiting the scope of the claims.

In the following polymerization reactions followed by the capping reaction, the reactants are combined in a conventional oil jacketed heated polyester reactor vessel equipped with a nitrogen bubbler that acts to remove volatile materials such a reaction byproduct water, reduce color formation and agitate the mixture.

In the formation of the capped polyester polyol, the dicarboxylic acid and the dihydroxyl compound is added to the vessel and heated to 140° C. Water a byproduct of esterification is formed and removed by nitrogen. After water generation slows, the temperature is gradually increased to 220° C. and the reaction is continued until the acid number falls to less than 20 preferable less than 10. At this point the molecular weight is greater than about 3000.

The reaction mixture is cooled and the glycidyl ester is then added to react with remaining acid groups. The reaction is heated to 140-190° C. This reaction forms secondary or primary hydroxyl groups with glycidyl ring opening.

Examples 1-6

Materials—
Adipic acid, CAS number 124-04-9, F.W. 146.14, melting point 150.85° C., boiling point 337.5° C., flash point 196° C.; 1,6-hexanediol, CAS number 6920-22-5, F.W. 118.18, melting point 40-42° C., boiling point 253-260° C., flash point 135° C. (Tag Closed Cup); Glycidyl ester Cardura E10P, boiling range 251-278° C. (5-95%), epoxide equivalent 240 g/mol, viscosity 7 mPa/s (23° C.), high flash point.

Synthesis of Polyester Precursor

| EX. 1-6 | Adipic Acid (g) | 1,6-Hexanediol (g) | Molar ratio between hydroxyl and carboxyl groups |
|---|---|---|---|
| Polyester 9, 11, 15, 16L, 16R | 900 (54.44 wt %) | 753 (45.56 wt %) | 1.035:1 |
| Polyester 13 | 900 (56.07 wt %) | 705 (43.93 wt%) | 0.969:1 |

753 g of 1,6-hexanediol (for polyester 9, 11, 15, 16L and 16R) and 900 g of adipic acid were reacted under a nitrogen atmosphere at a temperature in the range from 140 to 200° C. After water which had been formed in the reaction had been removed by distillation, the temperature was increased to range from 200-230° C. After the acid number had fallen to the expected data, the reaction was stopped. Then we measured the acid number and viscosity.

| EX. 1-6 | Acid Number (mg KOH/g) | Mn (calculated from theory) | Brookfield Viscosity (cP, 80° C., spindle #31, 20 rpm) |
|---|---|---|---|
| Polyester 9 | 8.22 (12 h) | 3389 | 2432 |
| Polyester 11 | 9.10 (13 h) | 3219 | 2064 |
| Polyester 15 | 11.70 (12 h) | 2802 | 1360 |
| Polyester 16L | 10.16 (14 h) | 3035 | N/A |
| Polyester 16R | 10.56 (14 h) | 2971 | N/A |
| Polyester 13 | 27.24 (9 h) | 2881 | 1600 |

Capping Reaction $$W_{E10P} = \frac{W_{polyester} * AN}{56110} * 240 \text{ (g)}$$

Reaction Proportions

| EX. 1-6 | Acid Number of polyester (mg KOH/g) | OH number of polyester (mg KOH/g) | $W_{polyester}$ (g) | $W_{E10P}$ (g) |
|---|---|---|---|---|
| Polyester 9 | 8.22 | 24.89 | 1221 | 42.93 (3.37%) |
| Polyester 11 | 9.10 | 25.77 | 1272 | 49.51 (3.75%) |
| Polyester 15 | 11.70 | 28.35 | 1336 | 66.86 (4.77%) |
| Polyester 16L | 10.16 | 26.82 | 1436 | 62.40 (4.16%) |
| Polyester 16R | 10.56 | 27.22 | 1436 | 64.86 (4.32%) |
| Polyester 13 | 27.24 | 11.72 | 1289 | 150.19 (10.44%) |

Polyester precursor was heated to 160° C. in nitrogen atmosphere, and then Cardura E10P was added into the reactor in 30 minutes in droplets. The reaction temperature was increased to 190° C. in 3 hours and hold for 3 hours. The residual epoxy in the final products is less than 0.02 mmol/g (epoxy residue is 0.032%). FIG. 1 shows the viscosity of the precursor polyester and the capped polyester.

Example 7

Materials—
Adipic acid, CAS number 124-04-9, F.W. 146.14, melting point 150.85° C., boiling point 337.5° C., flash point 196° C.; 1,6-hexanediol, CAS number 6920-22-5, F.W. 118.18, melting point 40-42° C., boiling point 253-260° C., flash point 135° C. (Tag Closed Cup); Cardura E10P, boiling range 251-278° C. (5-95%), epoxide equivalent 240 g/mol, viscosity 7 mPa/s (23° C.), high flash point.

Synthesis of Polyester Precursor

| EX. 7 | Adipic Acid (g) | 1,6-Hexanediol (g) | Molar ratio between hydroxyl and carboxyl groups |
|---|---|---|---|
| Polyester 17 | 12910 (54.45 wt %) | 10800 (45.55 wt %) | 1.0345:1 |

Reaction Procedure 10800 g of 1,6-hexanediol and 12910 g of adipic acid were reacted under a nitrogen atmosphere at a temperature in the range from 140 to 200° C. (in 5 hours). After most of the water which had been formed in the reaction had been removed by distillation, the temperature was increased to range from 220-230° C. (in 2 hours) and hold for 8.5 hours. After the acid number had fallen to the expected data, the reaction was stopped. Measure the acid number.

Results

| EX. 7 | Acid Number (mgKOH/g) | Mn (calculated from theory) |
|---|---|---|
| Polyester 17 | 7.95 (15.5 h) | 3452 |

| EX. 2-6 | Acid Number (mg KOH/g) | OH number of polyester (mg KOH/g) | Mn (calculated from theory) | Brookfield Viscosity (cP, 80° C., spindle #31, 20 rpm) |
|---|---|---|---|---|
| Polyester 11 | 0.93 (8.76) | 32.63 (24.80) | 3344 (3219) | 2256 |
| Polyester 15 | 1.22 (11.14) | 36.92 (27.00) | 2942 (2802) | 1472 |
| Polyester 16L | 0.86 (9.73) | 34.57 (25.70) | 3167 (3035) | 1856 |
| Polyester 16R | 1.11 (10.10) | 35.03 (26.04) | 3105 (2971) | 1696 |
| Polyester 13 | 2.00 (24.40) | 32.90 (10.50) | 3215 (2881) | 1632 |

The reaction time of polyester precursor can be shortened from greater than 20 hours to to 15 hours or less. The reaction temperature of polyester precursor ranges from 140 to 230° C. and holding at 220-230° C. for not less than 9 hours. The reaction of acid carboxyl with epoxy is stoichiometric. Final reaction temperature ranges from 160-190° C.

Synthesis Determination of the Dosage of Cardura E10P $$W_{E10P} = \frac{W_{polyester} * AN}{56110} * 240 \text{ (g)}$$

Recipes

| EX. 7 | Acid Number of polyester (mgKOH/g) | OH number of polyester (mgKOH/g) | $W_{polyester}$ (g) | $W_{E10P}$ (g) |
|---|---|---|---|---|
| Polyester 17 | 7.95 | 24.56 | 20581 | 697.4 (3.28%) |

Reaction Procedure

Polyester precursor was cooled to 140° C. in nitrogen atmosphere, then Cardura E10P was added into the reactor in 20 minutes. The reaction temperature was increased to 180° C. in 2 hours and hold for 2 hours. Stop the reaction when the acid number below 1 mgKOH/g.

Results

| EX. 7 | Acid Number (mgKOH/g) | OH number of polyester (mgKOH/g) | Mn (calculated from theory) | Brookfield Viscosity (cP, 80° C., spindle #31, 20 rpm) |
|---|---|---|---|---|
| Polyester 17 | 0.45 | 31.03 | 3565 | 3536 |

Figure 2:
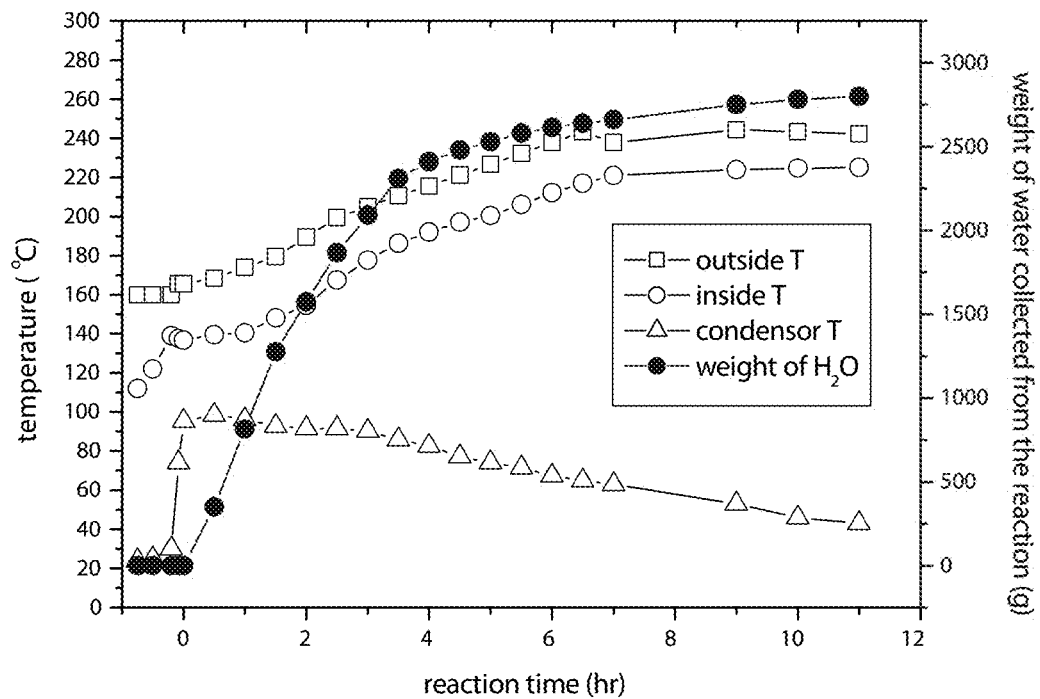
FIG. 2 is a graph showing temperature versus reaction time and temperature versus weight of water collected from the reactor for several reaction conditions of Polyester 17.

Reaction condition of polyester 17 (See FIG. 2 for graphical representation)

| Reaction time (hr) | Outside T (° C.) | Inside T (° C.) | Condensor T (° C.) | H2O wt. (g) |
|---|---|---|---|---|
| −0.75 | 160.0 | 112 | 24 | 0 |
| −0.5 | 160.0 | 122 | 25 | 0 |
| −0.2 | 160.0 | 139 | 30 | 0 |
| −0.08 | 165.6 | 137.7 | 74 | 0 |
| 0 | 165.6 | 136.8 | 95.3 | 0 |
| 0.5 | 168.3 | 139.5 | 98.5 | 350 |
| 1 | 173.9 | 140.4 | 96.2 | 815 |
| 1.5 | 179.4 | 148.1 | 92.6 | 1275 |
| 2 | 189.4 | 154.5 | 91.7 | 1575 |
| 2.5 | 199.4 | 167.5 | 91.7 | 1865 |
| 3 | 205.0 | 177.7 | 90.2 | 2090 |
| 3.5 | 210.6 | 186.2 | 85.8 | 2310 |
| 4 | 215.6 | 192.1 | 82.6 | 2410 |
| 4.5 | 221.1 | 197.1 | 77.3 | 2480 |
| 5 | 226.7 | 200.5 | 74 | 2530 |
| 5.5 | 232.2 | 206.1 | 71.5 | 2580 |
| 6 | 237.8 | 212.2 | 67.4 | 2615 |
| 7 | 237.8 | 221 | 63.1 | 2660 |
| 10 | 243.3 | 224.7 | 46 | 2780 |
| 12 | 243.3 | 224.4 | 38.8 | 2812 |
| 13 | 243.3 | 224.7 | 36.4 | 2825 |
| 15 | 243.3 | 223.6 | 34.1 | 2842 |
| 15.5 | 243.3 | 224 | 33 | 2846 |

Conclusion

The reaction time of polyester precursor can be shortened into 16 hours.

Reaction temperature of polyester precursor is range from 140 to 230° C. and holding at 220-230° C. for 8~9 hours.

The reaction of carboxyl with epoxy is in stoichiometry. Reaction temperature ranges from 140-180° C. Reaction time is around 5 hours.

The residual epoxy group in the final products is less than 0.02 mmol/g (epoxy residue is 0.032%).

Adhesive

Examples

| | Adhesive Example 1 | eq. wt. | % wt | OH | NCO | g 800 |
|---|---|---|---|---|---|---|
| 1 | Poly propylene glycol PPG2000 | 15.750 | 1000 | 15.7500% | 0.0158 | x | 126.00 |
| 2 | Capped Polyester 11 | 22.000 | 1750 | 22.0000% | 0.0126 | x | 176.00 |
| 3 | Linear saturated Dynacol 7250 polyester polyol EG/Hexane diol neopentyl glycol adipic acid ester | 17.500 | 2550 | 17.5000% | 0.0069 | x | 140.00 |
| 4 | CAPA5600 Capro-lactone polyester | 10.000 | 25000 | 10.0000% | 0.0004 | x | 80.00 |
| 5 | 3500 HAT Hexane diol adipic acid terephthalic acid ester | 22.000 | 1750 | 22.0000% | 0.0126 | x | 176.00 |
| 6 | BYK070 defoamer | 0.100 | 10000000 | 0.1000% | 0.0000 | x | 0.80 |
| 7 | MDI | 12.600 | 125 | 12.6000% | x | 0.1008 | 100.80 |
| 8 | DMDEE (2,2'-dimorpholino diethylether) | 0.050 | 10000000 | 0.0500% | x | x | 0.40 |
| | | | | 100.00% | | | 800.00 |
| | | 100.0000 | NCO % | 2.21% | 0.0482 | 0.1008 | |

| Adhesive Example 2 | eq. wt. | % wt | OH | NCO | g 800 |
|---|---|---|---|---|---|
| 1 PPG2000 | 15.750 | 1000 | 15.7500% | 0.0158 | x | 126.00 |
| 2 Capped polyester 13 | 22.000 | 1750 | 22.0000% | 0.0126 | x | 176.00 |
| 3 Dynacol7250 | 17.500 | 2550 | 17.5000% | 0.0069 | x | 140.00 |
| 4 CAPA5600 | 10.000 | 25000 | 10.0000% | 0.0004 | x | 80.00 |
| 5 3500HAT | 22.000 | 1750 | 22.0000% | 0.0126 | x | 176.00 |
| 6 BYK070 | 0.100 | 10000000 | 0.1000% | 0.0000 | x | 0.80 |
| 7 MDI | 12.600 | 125 | 12.6000% | x | 0.1008 | 100.80 |
| 8 DMDEE | 0.050 | 10000000 | 0.0500% | x | x | 0.40 |
| | | | 100.00% | | | 800.00 |
| | 100.0000 | NCO % | 2.21% | 0.0482 | 0.1008 | |

| Comparative Adhesive Example | eq. wt. | % wt | OH | NCO | g 800 |
|---|---|---|---|---|---|
| 1 PPG2000 | 15.750 | 1000 | 15.7500% | 0.0158 | x | 126.00 |
| 2 3500 molecular weight hexane-adipic acid polyester polyol | 22.000 | 1750 | 22.0000% | 0.0126 | x | 176.00 |
| 3 Dynacol7250 | 17.500 | 2550 | 17.5000% | 0.0069 | x | 140.00 |
| 4 CAPA5600 | 10.000 | 25000 | 10.0000% | 0.0004 | x | 80.00 |
| 5 3500HAT | 22.000 | 1750 | 22.0000% | 0.0126 | x | 176.00 |
| 6 BYK070 | 0.100 | 10000000 | 0.1000% | 0.0000 | x | 0.80 |
| 7 MDI | 12.600 | 125 | 12.6000% | x | 0.1008 | 100.80 |
| 8 DMDEE | 0.050 | 10000000 | 0.0500% | x | x | 0.40 |
| | | | 100.00% | | | 800.00 |
| | 100.0000 | NCO % | 2.21% | 0.0482 | 0.1008 | |

| Adhesive Ex | Visc (250° F.) cP | Open time, Sec, | Bond ABS/Wood |
|---|---|---|---|
| 1 | 18850 | 70 | Good |
| 2 | 16480 | 100 | Good |
| Comparative | 17120 | 60 | N/A |

Comp. Ex. and Examples 1 and 2 are same percentage but Comp. Ex. is with straight molecular weight hexane-adipic acid polyester polyol Ex. 1 is with Polyester 11 (with 3-4% Cardura) and Ex. 2 is with 10% Cardura capped polyester polyols. In the case of 22% polyester polyols in the formula, with low level Cardura (3-4%), the physical property are almost the same as regular polyester polyol. With higher Cardura, the finished viscosity is a little lower but with longer open time, which is because the Cardura use reduces the crystalline behavior. Lower viscosity and longer open time are often desired in process or in application.

As can be seen in the tables of data, the processes using the compositions disclosed above produce quality polyester polyol materials in a shortened period of time with substantially complete conversion to a useful polyol material with minimal residual acid or hydroxyl minimal residual acid functionality. The hydroxyl functionality of the polyol remains since in the reaction between the glycidyl ether or glycidyl ester materials and the polyol a new hydroxyl group is formed in the reaction that remains available for reaction with the isocyanate compound in a urethane adhesive.

The claims may suitably comprise, consist of, or consist essentially of, or be substantially free of any of the disclosed or recited elements. The invention illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims

I claim:

1. A method for the synthesis of a capped polyester polyol, the method comprising the steps of:
   (a) combining a polyester polyol having a molecular weight of at least 500 with a glycidyl compound at a ratio of one glycidyl compound per each active hydroxyl group in the polyester polyol to form a mixture, wherein the polyester polyol is a reaction product of a carboxylic acid with a carboxyl functionality of two or more and a hydroxyl compound with a hydroxyl functionality of two or more, and the glycidyl compound comprises a glycidyl ether or glycidel ester compound; and
   (b) reacting the polyester polyol with the glycidyl compound to form the capped material.

2. The method of claim 1, wherein the polyester polyol comprises a substantially linear aliphatic polyester.

3. The method of claim 2, wherein the aliphatic polyester is a reaction product of dicarboxylic acid and a diol.

4. The method of claim 1, wherein the polyester polyol is a reaction product of an aromatic dicarboxylic acid and a diol.

5. The method of claim 1, wherein the glycidyl ester comprises a carboxylic acid ester having 5 to 20 carbon atoms.

6. The method of claim 5, wherein the glycidyl ester comprises a compound of formula:

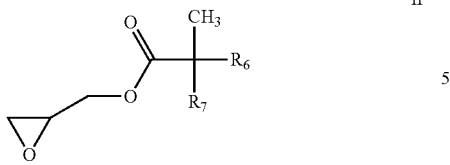

II wherein, R6 and R7 comprises linear or branched alkyl groups having from about one to about 20 carbon atoms.

7. The method of claim 6, wherein the total carbon content of the branched alkyl group of the acid group of the glycidyl ester is such from about 9 to about 15 carbon atoms.

8. A method for the synthesis of a capped polyester polyol, the method comprising the steps of:
   (a) forming a polyol from an aliphatic carboxylic acid with a carboxyl functionality of two or more and an aliphatic hydroxyl compound with a hydroxyl functionality of two or more to form a polyester polyol having a molecular weight of at least 500 by reacting the acid with the hydroxyl compound, at temperature greater than 190° C., to form a reaction mixture, until the acid number of the reaction mixture is less than 0.5; and
   (b) reacting the polyester polyol with a glycidyl ester at a temperature greater than 140° C. to form the capped material.

9. A polyurethane adhesive material comprising a reaction product of an isocyanate compound and the capped polyester polyol made by the method of claim 8.

10. The polyurethane adhesive material of claim 9, wherein the isocyanate compound is MDI.

* * * * *

UNITED STATES PATENT AND TRADEMARK OFFICE
CERTIFICATE OF CORRECTION

PATENT NO. : 9,884,981 B2
APPLICATION NO. : 14/627745
DATED : February 6, 2018
INVENTOR(S) : Zhijin Chen Page 1 of 1

It is certified that error appears in the above-identified patent and that said Letters Patent is hereby corrected as shown below:

In the Claims

Column 14, Line 51, Claim 1, delete "glycidel" and insert --glycidyl--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*